Patented Jan. 5, 1954

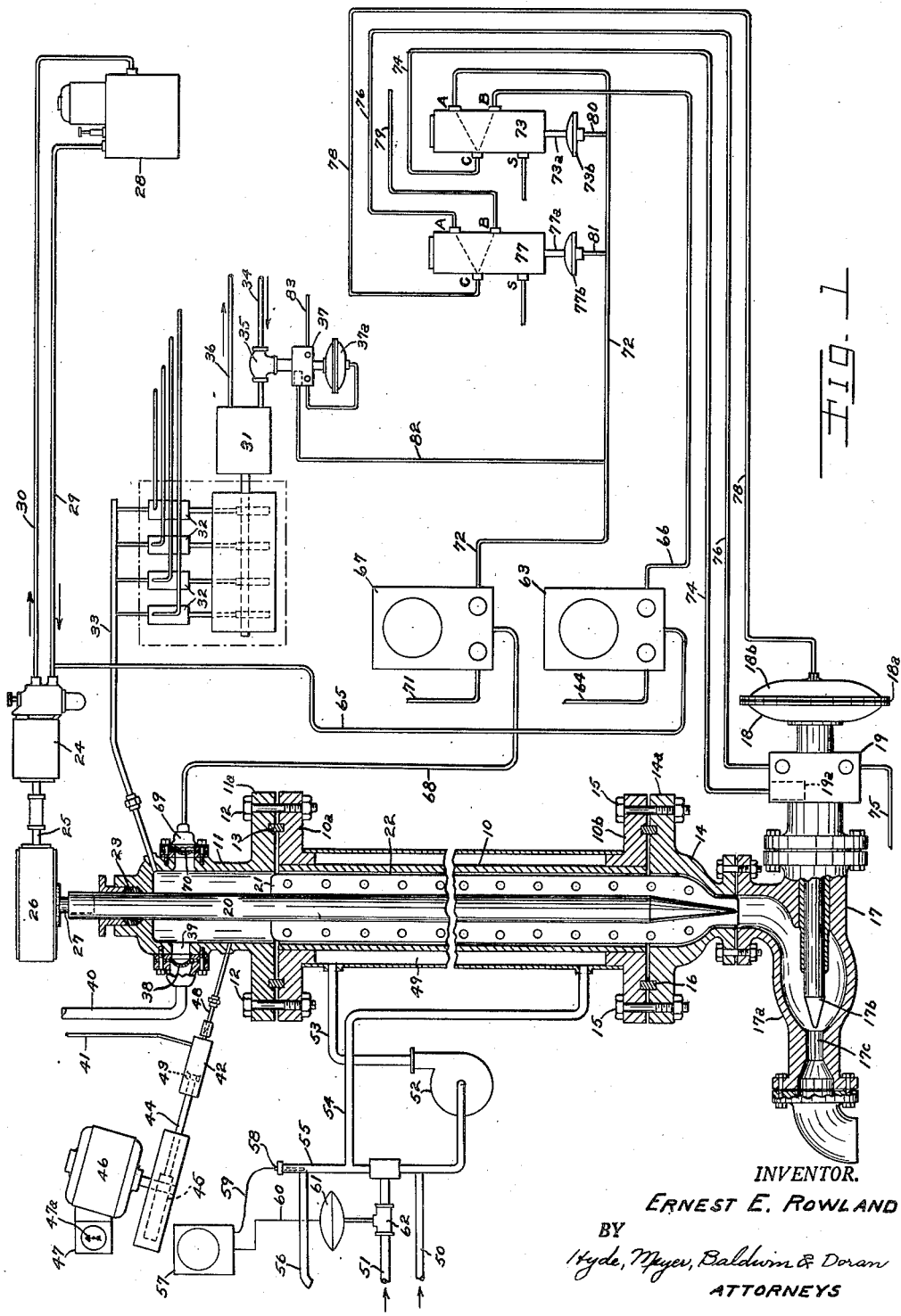

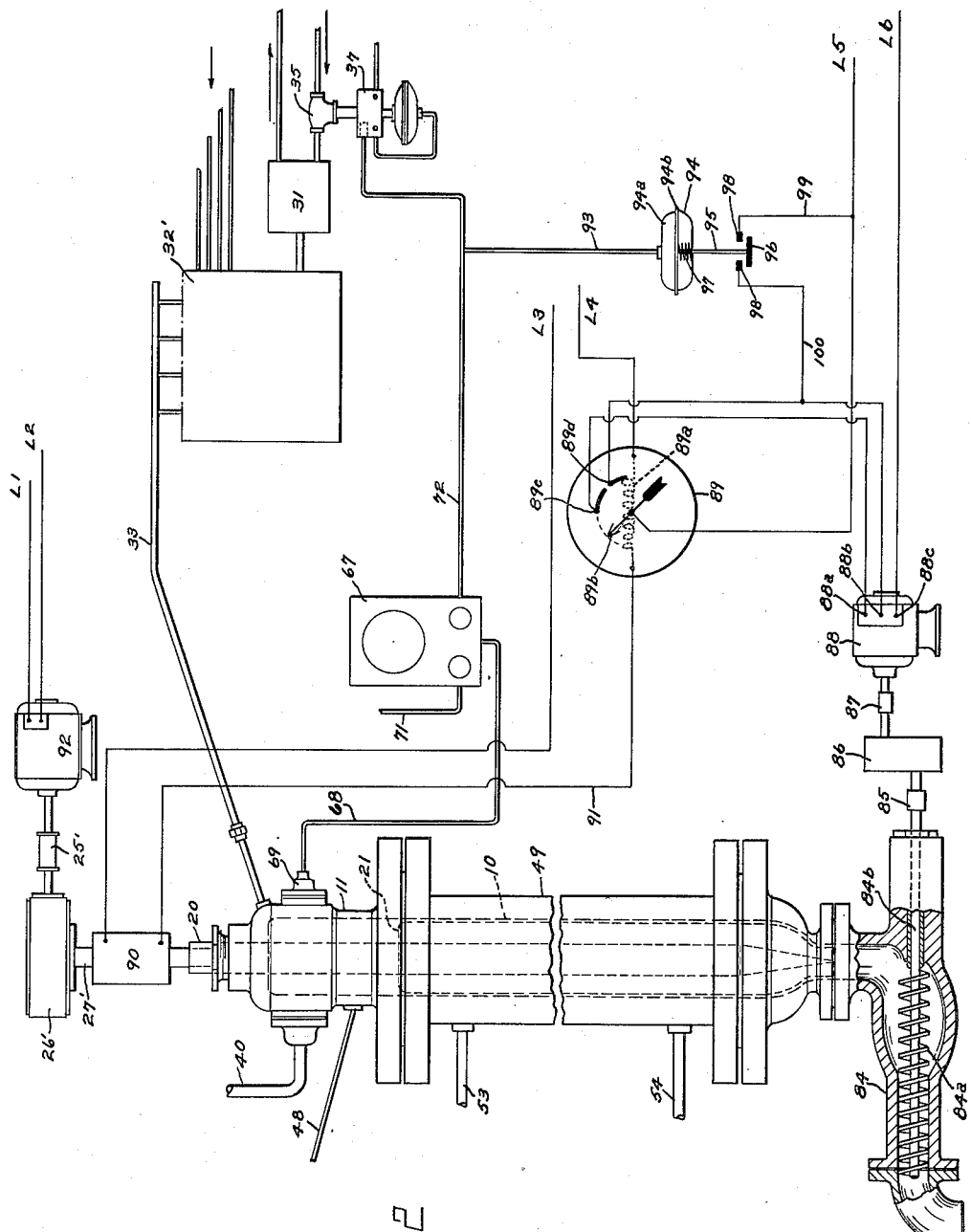

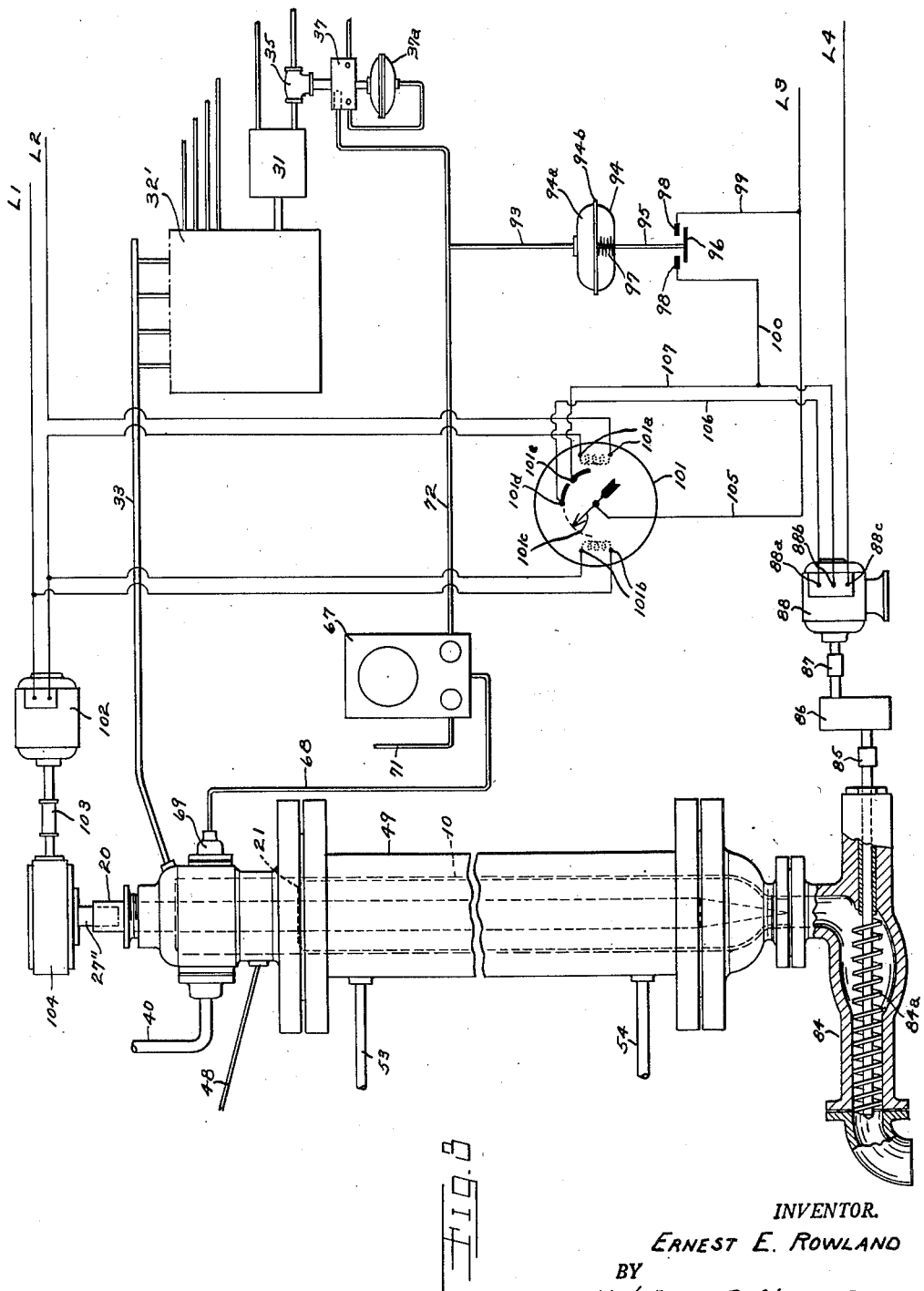

2,665,197

UNITED STATES PATENT OFFICE 2,665,197

POLYMERIZATION CONTROL APPARATUS

Ernest Edward Rowland, Akron, Ohio

Application August 3, 1950, Serial No. 177,392

8 Claims. (Cl. 23—285)

This invention relates to an improved method and apparatus for the continuous and controlled production of synthetic rubber, synthetic plastics and polymers of various kinds, particularly those of hydrocarbons and/or their derivatives.

It should be understood at the outset that my invention is not concerned with the particular polymerization product being formed but rather with a method and apparatus for continuously and efficiently producing a wide range of polymerization products. Certain examples will be given of particular polymerization products so as to illustrate the operation of my invention, but it should be understood that I do not claim to have originated the various monolefins, diolefins and their homologues as the polymerizable ingredients, or the diluents, or the plasticity control agents, or the catalysts. The present invention, however, is concerned with a novel method and novel apparatus for bringing these ingredients together, for carrying out the polymerization process, and for withdrawing the finished product of the polymerization process.

One of the objects of the present invention is the provision of novel apparatus for carrying out the polymerization process including an elongated, vertically positioned vessel or tube wherein the polymerization progresses continuously downwardly so that gravity separation is relied upon to carry the polymerized product to the discharge end of the vessel.

Another object of the present invention is the provision of novel control apparatus whereby a mixing or moving device is immersed in the polymerizing mixture and the resistance of the mixing or moving device or the power required to drive it is relied upon as a governing factor for controlling the extrusion or discharge of the polymerized product from the polymerization vessel.

Other objects and advantages of this invention are found in the apparatus and arrangements for introducing the ingredients into the polymerization vessel and for discharging the finished product therefrom, novel apparatus and arrangements for measuring or providing the governing factor by which the discharge of the polymerized product is controlled, and various features which render the entire process safe.

The purposes of my invention and the novel features of the methods and apparatus used for carrying out the same will be more clearly understood from the accompanying description, together with the drawings, and the essential features will be summarized in the appended claims.

In the drawings—

Fig. 1 is a diagrammatic view showing one embodiment of my invention with the polymerization vessel in central sectional view so as to more clearly understand the same;

Fig. 2 is a diagrammatic view of a modification of my invention, certain parts identical with Fig. 1 being omitted for sake of simplicity; while Fig. 3 is a diagrammatic view showing another modification of my invention with the parts identical with Fig. 1 being eliminated.

My invention will be explained in connection with the polymerization of butadiene and its homologues, either used alone or as mixtures of the diolefin homologues, or as mixtures in conjunction with monolefins, such as styrene and its homologues, methylstyrene and dimethylstyrene, and others. It should be understood that my invention is not limited solely to the polymerization of these ingredients but these teachings are applicable to many polymerization problems. Those familiar with this art will recognize that the polymerization methods now in use for treating these and other ingredients are unsatisfactory for the most part either because they are too slow, too variable or too unsafe. The present invention is intended to speed up the process, to render it substantially invariable and dependable and safe under all conditions.

One form of my invention is illustrated in Fig. 1. The polymerization vessel is a vertically disposed cylindrical tube 10 supported in any suitable manner. It is constructed to withstand the expected working pressure developed inside, and in the present case, I have illustrated a device adapted to withstand an internal pressure of 1500 pounds per square inch. The top is closed by a suitable cover 11 having a connecting flange 11a at its lower end integral with the cover for securing the same. The vessel 10 has upper and lower securing flanges 10a and 10b which are rigidly mounted on the vessel 10 in a liquid and pressure tight manner. The cover 11 is secured to the vessel 10 by bolting the flanges together as indicated at 12 with a suitable sealing gasket 13 between the parts. The lower end of the vessel is completed by a reducing nozzle 14 having a securing flange 14a integral with it. Bolts 15 secure flanges 14a and 10b together with a suitable sealing gasket 16 between them.

The nozzle or cap 14 at the lower end of the polymerization vessel converges to direct the product of polymerization to a device which controls the discharge from the lower end of the vessel. Any suitable controllable device may be utilized at this point. In Fig. 1, I have shown a diaphragm motor valve 17 having a valve body 17a, the hollow interior of which is of smooth sweeping flow characteristics so as not to hinder the free discharge of material. A needle valve 17b coacts with the discharge opening 17c to regulate the flow. The driving means is here shown as a diaphragm motor 18 of a known type having a movable diaphragm 18a connected with the needle valve 17b so that pressure in the chamber 18b causes the diaphragm to move the needle valve toward closed position, whereas release of pressure in the chamber 18b permits a spring (not shown) to return the needle valve toward the open position. A valve positioner is shown at 19, the function of which will be later described.

I have previously mentioned some means for mixing or moving the contents in the reactor vessel 10 while the polymerization is progressing. For purposes of illustration, I have here shown a shaft 20 extending axially of the tube 10 and having radial fins 21 rigidly connected thereto and extending to a fairly close clearance with the inside walls of the tube 10. In one form of my device, the clearance at 22 is of the order of $\frac{1}{16}$ inch. Sealing means is provided at 23 where the shaft 20 extends through the top of the cap 11. The upper end of the shaft is connected by suitable driving means. In Fig. 1, the driving means is a fluid motor 24 of the positive displacement and constant speed type, connected by shaft 25 with a speed reducer 26 which in turn has an output shaft 27 connected with shaft 20. The amount of fluid flowing through motor 24 is constant and is supplied from a pump and reservoir unit 28 through line 29. The excess pressure fluid returns through bypass line 30 to the pump and reservoir unit.

In Example 1, given later, I utilize butadiene and styrene as the polymerizable materials, normal pentane as a diluent, and dioxane as a plasticity control. In Fig. 1, I have shown a means for feeding these four ingredients at a controlled rate to the reactor vessel 10. It is obvious that more or less pumps might be provided depending upon the number of liquids to be fed and it is also obvious that other arrangements might be used to obtain a controlled feed of the various liquids. As shown in Fig. 1, a single positive displacement fluid drive motor 31 drives four pumps 32 each of which has a supply line connected with a source of supply for one of the above mentioned liquid ingredients and each of which has a discharge line connected with conduit 33 which passes through the cap 11 to discharge these ingredients to the interior of the reactor vessel. The pumps 32 may have varying diameter cylinders and/or varying strokes. In the case illustrated, the diluent pentane and the butadiene are using cylinders having $\frac{5}{8}$ inch internal diameter, whereas the styrene and dioxane are using cylinders having $\frac{1}{16}$ inch internal diameter. The strokes are adjustable so as to give the proportions desired, in this case, the proportions given in Example 1.

The supply of pressure fluid for motor 31 may be a pump and reservoir unit similar to 28 but not necessarily shown here, supplying a pressure fluid through line 34 under the control of valve 35. Excess pressure fluid returns to the system through bypass line 36. The valve 35 is a graduated flow valve having substantially straight line characteristics and includes a valve having a narrow valve seat and a piston portion of the valve which enters into the cylindrical portion of the valve seat. When the valve first opens, the flow is only that which is permitted between the piston and the cylinder where there is a clearance of about .002 inch. Shortly thereafter, the valve begins to open one or more V-shaped slots diverging downwardly on the outer face of the piston portion of the valve, and as the valve opens, more and more of these slots are open to flow and the slots are so arranged as to give the straight line graduation.

Valve 35 is under the control of valve positioner 37 which is shown somewhat diagrammatically but which may be conveniently a "Vernier Valvactor" of The Foxboro Company of Foxboro, Massachusetts.

A safety device is provided to guard against excessive pressure in the reactor vessel 10, and this takes the form of a rupture disc 38 which normally closes an opening 39 through the cap 11. Upon excessive pressure in the reactor vessel, the disc 38 will be ruptured and material will be discharged to a safe point through the pipe 40. It should be noted that the discharge from the inlet pipe 33 is directed toward the rupture disc so as to continuously wash it clear of all rubber-like material.

Separate means is provided for introducing a catalyst into the upper portion of the reactor vessel 10. My examples illustrate the use of a sodium catalyst although it will be understood that potassium, calcium, lithium or alloys of these may also be used. I prefer to use the sodium in a finely divided form dispersed in a suitable carrier such as "Vaseline." This catalyst is supplied under pressure through a pipe 41 to the forward end of a cylinder 42 which in turn is equipped with a piston 43 which has a piston rod 44 having a rack and pinion connection 45 with the drive shaft of a motor 46. A periodic time controller is shown at 47 operatively connected with motor 46 for operating it intermittently for a predetermined period which is adjustable at 47a. Each time that motor 46 operates it drives the piston 43 for a predetermined number of strokes which forces the catalyst through the pipe 48 into the upper end of the reactor vessel. This catalyst might be pumped in by hand as desired but I prefer some sort of automatic control so that this need not be watched.

To maintain the reactor vessel 10 at the desired temperature, a water jacket 49 is provided embracing it and a suitable cooling system is connected therewith. In the present instance, I have shown a source of cold water supply 50 and a source of steam supply 51. A pump 52 forces the water through line 53 to the upper end of the water jacket. The discharge from the lower end of the jacket passes through pipes 54, 55 and 56, where it is discharged. A temperature controller is shown at 57 of known type which receives its controlling impulse from a thermometer 58 through a Bourdon tube 59. 60 indicates an operative connection between the controller 57 and a diaphragm 61 which controls the position of a valve at 62 so as to inject more or less steam into the cold water line 50 so as to maintain a constant temperature in the reactor vessel.

As previously mentioned, I prefer to use automatic control means whereby the discharge of polymerized material from the lower end of the reactor vessel is controlled according to viscosity or stiffness of the material polymerizing in the vessel. For this purpose, I utilize what I have called a rotor resistance controller 63 which may be of any type to accomplish my purpose but which preferably is a resetting type recording pressure controller. I have here shown specifically what is known as a "Stabilog" pressure controller manufactured by the above mentioned The Foxboro Company. This controller has a supply of air under pressure at 64 and in the present instance this is under about seventeen pounds per square inch pressure. The controlling pressure for the controller 63 comes from line 65 which is connected to line 29 which supplies the pressure fluid to the fluid motor 24. The controller 63 exerts an effect on the air entering the same from the source 64 responsive to the pressure supplied in line 65. Normally, there is a drop through the controller of about two pounds so that with the supply at seventeen pounds, as previously mentioned, the normal supply at the outlet line 66 would be about fifteen pounds per square inch. The controller 63 is of the reverse acting type so that increased pressure in line 65 results in decreased pressure in line 66.

A second controller 67 similar to the controller 63 is connected by line 68 to a chamber 69 which communicates through diaphragm 70 with the pressure in the reactor vessel 10. The diaphragm 70 is sufficiently strong so as not to be ruptured under normal working pressure. Line 68, chamber 69 and the communicating parts in the controller 67 are liquid filled so that the diaphragm pressure inside the reactor vessel against the diaphragm 70 is transmitted to the controller 67. This controller has a supply of air at constant pressure, say seventeen pounds per square inch, at line 71. The action of the controller determines the pressure in the outlet line 72 which normally is at about fifteen pounds per square inch. The controller 67 is also of the reverse acting type wherein increased pressure in line 68 results in decreased pressure in line 72.

Line 66 of controller 63 is connected to port B of pilot valve 73. Line 72 of instrument 67 is connected to port A of pilot valve 73. This valve is a three-way pilot valve made by Taylor Instrument Companies, Rochester, New York, and called No. 88S52. The valve has a plunger 73a which is under the control of a diaphragm device 73b. The device may be adjusted to operate under a predetermined air pressure in line 72. When the plunger 73a actuated by air pressure in the diaphragm 73b is moved upwardly (against a spring not shown), the ports A and C are connected. When the air pressure is insufficient to lift the plunger, then its spring moves it down against a stop and ports B and C are connected. The port C of pilot valve 73 is connected by line 74 with a control bellows 19a in the positioner 19, previously mentioned. This positioner is of a well known type which is supplied with air under constant pressure of about seventeen pounds per square inch from a source 75 and controls the pressure in line 76, responsive to the pressure in the bellows 19a. The line 76 is connected with the port A of another three-way pilot valve 77 which is exactly like the valve 73. This valve has a plunger 77a under the control of diaphragm 77b. Port C of valve 77 is connected by line 78 with the chamber 18b of the diaphragm motor 18. When plunger 77a is in its up position, ports A and C are connected, and when the plunger is in its down position the ports B and C are connected. Port B communicates by line 79 to atmosphere.

The operation of the apparatus of Fig. 1 will now be described. In starting the process, the feed pumps 32 are operated until a calculated amount of material is pumped into the reactor vessel 10 to fill about the bottom third of the reactor vessel. The proper amount of catalyst is introduced by operating the motor 46. There is then a wait of about three hours until the catalytic action is properly started in that portion of the material in the vessel. After this, another third of the vessel is filled and suitable catalyst added after which there is another wait of about three hours. Then the final third is filled and then another wait of about three hours. In this way, the entire reactor chamber is filled to the proper level in about nine hours and, in the process under consideration, polymerization is about ready to produce the synthetic rubber in the bottom of the reactor chamber in say four to ten hours, under normal conditions.

Then the motor 24 is started to turn the rotor blades 21 in the reaction vessel. As the material polymerizes in the vessel it tends to settle toward the bottom of the vessel. The movement of the stirring device 21 in his example is about twenty to thirty revolutions per minute so as not to agitate the polymerizing material but simply to keep it moving slowly and allow the heavier material to settle by gravity toward the bottom of the reactor chamber. As the material polymerizes and as the volume of the polymerized material in the bottom of the vessel becomes larger, the greater volume of this polymerized material and its greater viscosity renders it progressively harder to turn the shaft 20. Since the motor 24 is of constant speed and positive displacement, the pressure of the hydraulic fluid in the supply line 29 must be increased to keep up the constant speed. This pressure is fed through line 65 to the rotor resistance controller 63.

Referring now to the controller 67, as the process starts up, there is a low pressure within the reaction chamber 10 and therefore low pressure in line 68 and high pressure in outlet line 72, as previously described. This pressure is fed through line 80 to the control diaphragm 73b of valve 73. If the pressure is above twelve pounds per square inch, in this modification, diaphragm 73b moves upwardly. This closes a normal leak port at the upper end of valve 73 so that now air entering at the inlet port S of valve 73 acts beneath the plunger thereof so as to throw the valve upwardly and provide communication between the associated ports A and C. Thus, the high pressure from line 72, say fifteen pounds at the start, will pass from line 73 through ports A and C of valve 73 and through line 74 to the bellows 19a of the valve positioner 19. The output pressure therefrom through line 76 passes through valve 77 from ports A to C thereof and through line 78 to chamber 18b of diaphragm motor 18, which at fourteen pounds or better holds the valve 17b closed. It should be understood that under the above conditions line 81 communicates the high pressure from line 72 so that air from supply port S of valve 77 holds the plunger 77a in its uppermost position joining ports A and C thereof. Thus, as the process is getting under way, no material is allowed to escape from the lower end of the reaction vessel 10.

As normal working pressure begins to build up in the reaction vessel, the increased pressure through line 68 to controller 67 will cause a decreased air output in line 72 which will drop below twelve pounds per square inch, at which time the plunger of valve 73 is set to drop downwardly connecting ports B and C thereof. From this time on, during normal operation, the control of valve 17b will be entirely under the influence of controller 63.

As motor 24 encounters more resistance responsive to the polymerization of more rubberlike material building up in the bottom of chamber 10, the pressure in line 65 increases because, as previously described, higher fluid pressure is necessary in line 29 to keep motor 24 turning at constant speed. This higher pressure in line 65 results in decreased air output in line 66. Under these conditions, this air passes through valve 73, of which ports B and C are now connected, and then flows through line 74 to the valve positioner bellows 19a. As previously stated, valve 17b is closed at fourteen pounds per square inch in the bellows 19a and then continues to open gradually as the pressure decreases in bellows 19a in the manner just described. When the pressure in bellows 19a is at about three pounds per square inch, valve 17b will be completely open.

I have thus provided an arrangement whereby valve 17b is closed as long as motor 24 turns easily and valve 17b is gradually opened depending upon the resistance met by the rotor blades 21 which increases the load on motor 24.

The chief purpose of the controller 67 is to throw the control job on to controller 63 under normal conditions but, under emergency conditions when the pressure in the reaction chamber 10 becomes excessively high, the purpose of controller 67 is to take over control of the valve 17b. If, for some reason, the pressure in this reaction vessel should become excessively high, this will increase the pressure in line 68 which will decrease the pressure in line 72. If it drops below three pounds per square inch, then the diaphragm 77b is arranged to permit the plunger in valve 77 to drop down so as to connect the ports B and C of this valve. Since port B leads to atmosphere and port C is connected through line 78 to the chamber 18b of the diaphragm motor 18 controlling valve 17b, the pressure holding valve 17b closed is immediately relieved and the valve 17b slams open so as to relieve the pressure in the reaction chamber 10.

The device is so set up, that if air pressure for the various control devices should fail, then the valve 17b is thrown wide open and pump 31 stops.

The control of pump 31 will now be described. Valve 35 is under the control of valve positioner 37 which has a bellows 37a subjected to the pressure of the fluid in line 82 which is a branch of line 72 and under the influence of controller 67. A supply of air under about seventeen pounds constant pressure is provided through line 83 for the valve positioner 37. The positioner controls the flow through this line to the diaphragm device 37a which controls the position of valve 37. When the pressure is low within the reactor chamber 10, the air pressure is high in lines 72 and 82. The parts are so adjusted that when the pressure in line 82 is twelve pounds or greater, then the valve positioner opens the valve 35 to its full open position. This corresponds to full feed through line 33 of the various ingredients going into the reactor chamber. Obviously, as the reactor chamber becomes full, the combined vapor pressures increase the pressure in the upper portion of the reactor chamber 10 and as the pressure on line 68 increases, controller 67 decreases the air output to lines 72 and 82, and when the pressure in line 82 gets down to five pounds per square inch, then the parts are so adjusted that the valve positioner 37 completely closes valve 35. At intermediate pressures between five and ten pounds per square inch, the valve 35 is moved to various graduated positions so as to maintain a fairly constant condition in chamber 10 as regards pressure. This means that the reaction chamber 10 is kept substantially filled at all times.

In the modification of Fig. 2, parts having the same functions as those of Fig. 1 are given similar reference characters. It is to be understood that this device operates the same as the device of Fig. 1 except for the differences about to be described.

In this form of device, the control of the discharge of polymerized product from the reactor chamber 10 is through a screw conveyor device indicated at 84. Here the housing is provided with a stream flow interior and the outlet opening is substantially closed by means of the conveyor flight itself indicated at 84a. This flight has a shaft 84b which is coupled at 85 to a speed reducer 86 which in turn is driven through coupling 87 by electric motor 88. This motor is of the two-speed winding type having a low speed winding between the taps 88a and 88c and a high speed winding between taps 88b and 88c. This motor is under the control of a galvanometer type controller 89 having an actuating winding 89a in series from the source $L_3$ through torque meter 90 on shaft 27', then through line 91, coil 89a and back to the source $L_4$. The torque meter 90 is of any suitable device adapted to produce a result depending upon the torque exerted on shaft 27' to rotate the stirring device 21. In the present instance, the shaft is rotated through a speed reducer 26' which is coupled at 25' with an electric motor 92. This motor is supplied through source $L_1$, $L_2$.

In one embodiment of my device, I use a type SR–4 torquemeter made by Baldwin Southwark Division of The Baldwin Locomotive Works, Philadelphia, Pennsylvania. This meter measures the electric tortional strain at the surface of the shaft itself. With a light torque transmitted through shaft 27', the galvanometer control device armature 89b is moved to contact 89c, whereas, with a greater torque exerted through shaft 27', the armature 89b moves to contact 89d.

The operation of this form of my device should now be clear. With the reactor chamber 10 charged by means of motor 31, pumps 32', through line 33 as previously described, the device goes into operation and so long as the torque through shaft 27' is very light (before polymerization has proceeded very far), the armature 89b of controller 89 remains in the zone indicated in Fig. 2. With greater torque developed in shaft 27', corresponding to a collection of polymerized product in the bottom of the reactor chamber, then armature 89b moves to contact 89c thus completing a circuit from source $L_5$ across taps 88a and 88c of motor 88 to the source $L_6$. This operates the screw flight 84a at slow speed. If the accumulation of polymerized product in the bottom of the reactor chamber 10 becomes great enough to cause greater torque to be exerted through shaft 27', then the armature 89b contacts the tap 89d of the controller 89 so as to complete a circuit from source $L_5$, $L_6$ through taps 88b and 88c of motor 88, causing this motor to drive the screw conveyor 84a at a higher speed. Thus, the removal of the polymerized product from the reactor chamber responds to the torque in shaft 27' which is roughly a measure of the power necessary to move the stirring device 21 in the reactor chamber.

The safety device 69, 68, 67 is the same as described in Fig. 1. If the pressure becomes too great in the reactor chamber 10, this pressure is passed through line 68 to controller 67 and causes the pressure in the line 72 to be greatly decreased, as previously described. Line 93 connected with line 72 communicates with chamber 94a of a diaphragm control device 94 having a diaphragm 94b which is connected through rod 95 with a switch contact 96. A spring 97 normally maintains diaphragm 94b in a position balanced against the pressure in chamber 94a. Under high pressure conditions in the reactor chamber 10, the pressure in lines 72 and 93 drops to such a degree that spring 97 is able to push upwardly on the diaphragm 94b thus causing the switch contact 96 to close the contact points 98, thus completing a circuit between the source L5, L6 through lines 99 and 100 and taps 88b and 88c of motor 88 so as to operate this motor at high speed and cause the conveyor 84a to quickly discharge the large amounts of polymerized material from the bottom of the reactor chamber 10.

In the modification of Fig. 3 parts which are like those already described in Figs. 1 and 2 as to their construction and function are given similar reference characters. The principal difference over Fig. 2 is that, whereas in Fig. 2, a torque meter 90 is utilized for controlling the outlet of polymerized material from the bottom of the reactor chamber 10, in Fig. 3 a wattmeter type of control member 101 is utilized for this purpose as measuring the power input to electric motor 102 which through a shaft connection 103 drives a speed reducer 104 which in turn drives the shaft 27'' which is connected to the shaft 20 having stirring blades 21 as disclosed in Fig. 1. To operate the wattmeter control 101, I have shown diagrammatically a current coil connected between the taps 101a in series in the source line L2 and a voltage coil connected between the taps 101b across the source lines L1 and L2. An armature indicated at 101c is subject to the wattmeter control device and this turns in a clockwise direction from the position shown in Fig. 3 upon the use of a greater amount of power by the motor 102, corresponding to greater power required to turn the stirring blades 21 upon the collection of larger amounts of polymerized material in the reactor chamber 10.

In Fig. 3 I have shown a conveyor flight 84a like Fig. 2 for controlling the discharge of polymerized product from the lower portion of the reactor chamber. This is driven through a motor 88 having two different speed windings as described in connection with Fig. 2.

The operation of this form of device should now be clear. With the reactor chamber 10 charged by means of motor 31, pumps 32', through line 33 as previously described, the device goes into operation; and so long as the torque through shaft 27'' is very light (before polymerization has proceeded very far) the drain on electric motor 102 is very light and therefore the wattmeter control device 101 will remain approximately in the position shown in full lines in Fig. 3. As the polymerized product collects in the bottom of reactor chamber 10, the load on motor 102 increases so that the wattage is increased and the armature 101c moves to where it engages the tap 101d of the wattmeter control device. This completes a circuit from the source L3 through line 105, armature 101c, tap 101d, line 106, and the low speed winding between taps 88a and 88c of motor 88 to the source L4. This causes the conveyor flight 84a to turn at slow speed so as to remove polymerized product slowly from the reactor chamber 10. If the accumulation of polymerized product in the bottom of the reactor chamber becomes great enough to cause a still greater load on the motor 102, then the wattmeter device 101 will be energized to the extent that its armature 101c will move in a clockwise direction until it engages the tap 101e. This completes a circuit from the source L3 through line 105, armature 101c, tap 101e, and line 107 through the high speed winding between taps 88b and 88c of motor 88 to the source L4. This causes the motor 88 to drive the screw conveyor 84a at a higher speed. Thus, the removal of the polymerized product from the reactor chamber responds to the load on motor 102 which is roughly a measure of the power necessary to move the stirring device 21 in the reactor chamber.

Here, the safety device through line 68, controller 67, lines 72 and 93, diaphragm controller 94 and contact 96 is the same as that described in connection with Fig. 2. Upon the creation of excessive pressure for any reason in the reactor chamber 10, this safety device acts to close the contacts 98 so as to complete a circuit through the high speed winding of motor 88, thus to remove additional material from the lower end of reactor chamber 10 to reduce the pressure therein.

Typical charges from which polymers and elastomers can be prepared and produced continuously, are:

|  | Ingredient | Parts charged by weight |
|---|---|---|
| Example No. 1 | Normal pentane | 100.0 |
|  | Butadiene | 75.0 |
|  | Styrene | 25.0 |
|  | Dioxane | 1.0 |
|  | Sodium catalyst | 0.3 |
| Example No. 2 | Normal butane | 100.0 |
|  | Butadiene | 80.0 |
|  | Styrene | 20.0 |
|  | Dioxane | 0.7 |
|  | Toluene | 3.0 |
|  | Sodium catalyst | 0.3 |
| Example No. 3 | Methyl cyclohexane | 200.0 |
|  | Butadiene | 100.0 |
|  | Dioxane | 1.0 |
|  | Sodium catalyst | 0.3 |

Other diluents besides pentane, butane and methyl cyclohexane that can be used are saturated paraffin hydrocarbons that can be removed by distillation at temperatures below 200 degrees C., toluene, xylenes, cumene, ethyl benzene, and other benzene homologues or their hydrogenated products that can be removed by distillation at temperatures below 200° C.

Butadiene and its homologues may be used alone or mixtures of the diolefin homologues may be used as the polymerizable ingredients. These diolefin hydrocarbons may be used singly or as mixtures in conjunction with monolefins. The monolefins that can be used are styrene and its homologues such as methylstyrene and dimethyl styrene.

For the plasticity control, dioxane, other cyclic ethers, acrylic esters and any other compound that will not react with metallic sodium but will react with hydrocarbon derivitives of sodium, may be used.

Instead of sodium; potassium, calcium, lithium or alloys of these may be used for the catalyst.

Variations in combinations and amounts of these ingredients may be used to obtain polymers of desired properties.

Those familiar with this art will understand that I have given only a few examples to illustrate how my apparatus and method may be used to provide continuous polymerization of many kinds of synthetic rubber, plastics, and other similar products.

While I have shown one type of mixing device as consisting of the vanes 21, it will be understood that any proper mixing or moving devices such as shafting, blades, propellers, screws, flutes, rifling, etc. either used alone or in conjunction with or in combination with any of the others to obtain proper displacement of the material in the reactor chamber may be used. Obviously, any such device being moved in the polymerizing product will cause a greater resistance to turning which is used as the initiation of the control operation as described in connection with the various views of the drawings.

For controlling the discharge of the polymerized material at the bottom of the reactor chamber, I have shown in Fig. 1 a valve and in Figs. 2 and 3 a spiral conveyor. It will be understood by those familiar with this type of equipment, that suitable valves, rams, screws, or conveyors may be utilized for this purpose provided they are equipped with the proper power means to control the position of the discharge device in accordance with the power necessary to turn the moving and mixing devices in the reactor chamber. It will be understood that the valve 17 of Fig. 1 might be used in Figs. 2 and 3 with the proper control and likewise the screw conveyor 84a might be used in Fig. 1.

I have shown the mixing device being driven by a fluid motor 24 in Fig. 1 and by electric motors 82 and 102 in Figs. 2 and 3. Likewise I have shown the discharge control device being driven by a fluid operated diaphragm motor in Fig. 1 and by electric motors 88 in Figs. 2 and 3. In any of these locations a suitable power device may be utilized and those skilled in this art will understand how to tie the various control devices to this power equipment no matter what its character.

The temperature in the reaction chamber is controlled by a jacket around the same through which a heating or cooling medium may be circulated or the heating and cooling medium might be circulated through a hollow shaft in the position of the shaft 20 or the mixing and moving devices themselves might be hollow and heating and cooling medium pumped through such hollow devices.

The method of controlling the process might, in certain instances, be carried out manually although I prefer to use automatic devices as disclosed. This control is operated in such a manner as to expel the polymerized product at the desired time and under the desired condition and may be accomplished responsive to temperature, pressure, specific gravity or viscosity and the controlling impulse may depend upon a measurement of torque, power, gravity or temperature taken singularly or in any combination. Particularly in an exothermic reaction, a type of control wherein the viscosity is important as the reacting material approaches the condition of the desired product, its rate of approach to the desired product is a function of its viscosity and its density. The torque or the power required to rotate or move the agitating device is a function of the viscosity of the reacting material. A suitable device that results in response to this torque or power may be used as the primary measuring element to initiate control, and which through suitable relays may control a secondary servo-mechanism which will allow the product to be ejected or discharged so as to maintain a relatively constant predetermined torque or power requirement, thus indirectly maintaining the desired quality of the product.

It is conceivable that with the control being dependent on the viscosity of the product, the reaction may proceed improperly with the resulting viscosity of the product being out of the range of the control as set up and thus to exceed the desired or safe working pressure of the apparatus. Under these conditions, I have provided that at a predetermined maximum pressure in the reactor chamber, the control will be transferred by relay to some other instrument or control device to operate the product discharge control by a sufficient amount to withdraw sufficient material from the reactor chamber to maintain the safe pressure limits.

While all of the advantages of my invention are not realized without automatic control, my invention may rely upon manual control of conditions in the reactor chamber following viscosity tests of the discharged product, or following the indications of a torque meter such as that shown at 90, Fig. 2.

What I claim is:

1. Apparatus for the continuous operation of a polymerization process comprising means providing a reactor chamber having an elongated generally vertically disposed passageway, means for introducing liquid charge material into the upper portion of said chamber, a mixing device in said passageway, power means for moving said mixing device, variable means restricting and controlling the discharge of product from the lower end of said chamber, a control device responsive to the resistance of the charge material in said passageway exerted against said mixing device, and an operative connection between said control device and said discharge control means.

2. The combination of claim 1 including a second control device responsive to the pressure in said chamber, and an operative connection between said second control device and said discharge controlling means.

3. The combination of claim 1 including pump means for introducing liquid charge material into the upper portion of said chamber, a second control device responsive to the pressure in said chamber, and an operative connection between said second control device and said pump means for increasing and decreasing the rate of operation of said pump means respectively as the pressure in said chamber decreases and increases.

4. The combination of claim 1 wherein said power means for moving said mixing device comprises a fluid motor of the positive displacement constant speed type and a source of pressure fluid supply therefor, and said control device is responsive to the pressure of said fluid supply.

5. The combination of claim 1 wherein said power means for moving said mixing device includes a torsion responsive member, a torque meter responsive to said last named member, and said control device responsive to said torque meter.

6. The combination of claim 1 wherein said power means for moving said mixing device includes a motor and a power supply therefor, a meter responsive to the power input to said motor, and said control device responsive to said meter.

7. The combination of claim 1 wherein said discharge controlling means comprises a valve.

8. The combination of claim 1 wherein said discharge controlling means comprises a conveyor.

ERNEST EDWARD ROWLAND.

References Cited in the file of this patent

UNITED STATES PATENTS

| Number | Name | Date |
|--------|------|------|
| 1,320,323 | Drucker et al. | Oct. 28, 1919 |
| 2,122,805 | Wuff et al. | July 5, 1938 |